A. A. ANDERSON.
FISHHOOK.
APPLICATION FILED OCT. 27, 1916. RENEWED AUG. 2, 1919.
1,333,148.
Patented Mar. 9, 1920.
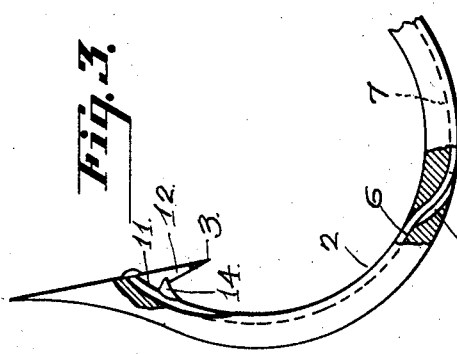
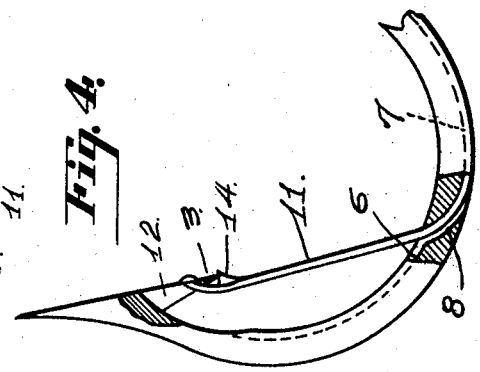
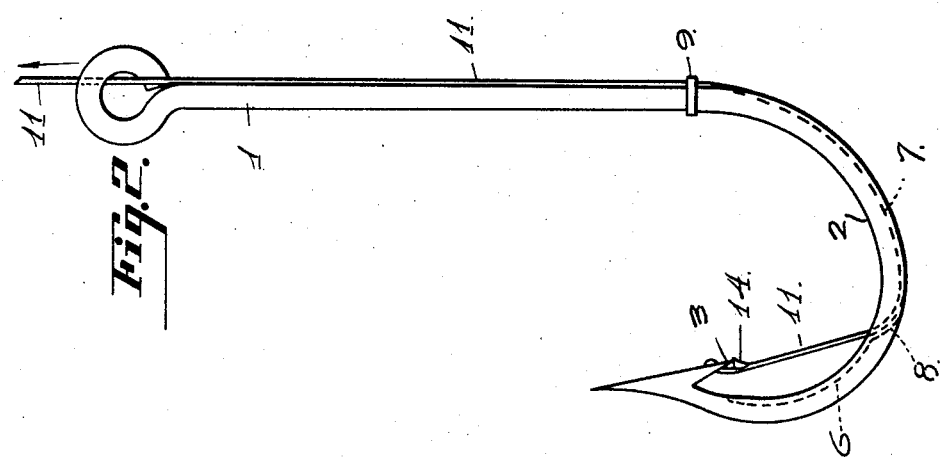
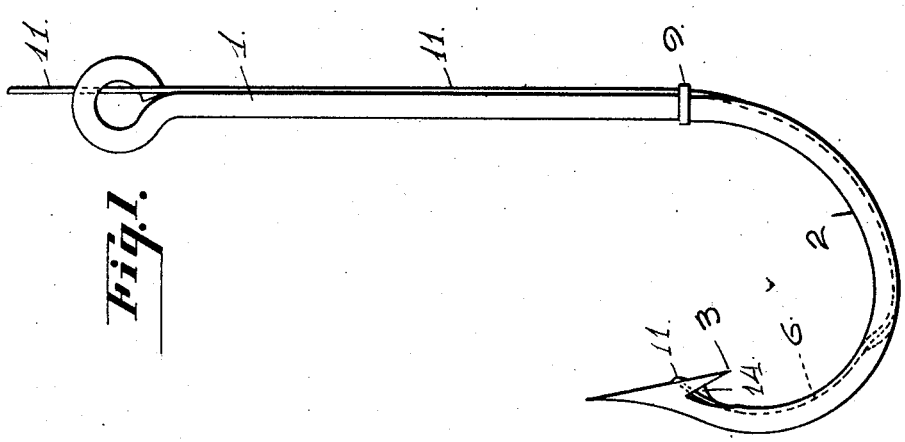
Inventor
Archibald A. Anderson
By Arthur L. Slee
His Atty.

UNITED STATES PATENT OFFICE.

ARCHIBALD A. ANDERSON, OF SAN FRANCISCO, CALIFORNIA.

FISHHOOK.

1,333,148.   Specification of Letters Patent.   Patented Mar. 9, 1920.

Application filed October 27, 1916, Serial No. 130,270. Renewed August 2, 1919. Serial No. 315,343.

*To all whom it may concern:*

Be it known that I, ARCHIBALD A. ANDERSON, a citizen of the United States, residing in the city and county of San Francisco and State of California, have invented a new and useful Improvement in Fishhooks, of which the following is a specification.

My invention relates to fish hooks wherein a flexible member operates in conjunction with a projection thereon for the purpose of stripping and masking the barb of the hook; and the objects of my invention are—

First, to provide a fish hook having improved means adapted to facilitate the removal of a fish or the like from said hook;

Second, to provide an improved device adapted to strip the contents of the hook from the barb, and Third, to provide improved means adapted to mask the inner point of the barb of a fish hook and thereby facilitate the removal of the contents of the hook therefrom.

I accomplish these several features by means of the preferred form of the device disclosed in the drawings forming a part of the present specification wherein like characters of reference are used to designate similar parts throughout the said specification and drawings, and in which—

Figure 1 is an enlarged side elevation of a fish hook disclosing the normal position of my device attached thereto.

Fig. 2 is a view similar to Fig. 1 but disclosing the device in an operative position.

Fig. 3 is a greatly enlarged sectional view of a portion of the bend and the barb of a fish hook with the device disclosed in a normal or inoperative position, and Fig. 4 is a view similar to Fig. 3 but with the device in an operative position.

Referring to the drawings the numeral 1 is used to designate the shank of a fish hook having the usual bend 2 and barb 3 arranged just below the point 4.

The bend 2 is provided with an inner and outer channel or groove 6 and 7 respectively and an aperture 8 connecting said grooves.

The shank 1 of the hook is provided with a suitable apertured eyelet or collar 9. A flexible wire 11 is slidably mounted within the eyelet or collar 9 and the grooves or channels 6 and 7 and aperture 8 connecting the same and has one end slidably mounted within a longitudinally disposed slot 12 within the barb 3, said end being provided with a projection 14 formed integral therewith, the purpose of which will hereinafter be more fully set forth.

The wire 11 is normally positioned with its end away from the barb 3 as disclosed in Figs. 1 and 3 of the drawings. By pulling the wire 11 in the direction indicated by the arrow in Fig. 2 of the drawings the said wire will bridge a portion of the space between the bend 2 and the barb 3 of the hook as disclosed in Figs. 2 and 4 of the drawings and simultaneously cause the projections 14 to cover or mask the point of the barb 3.

As the end of the wire 11 in the slot 12 moves toward the point of the barb 3 it will strip said barb of its contents and as the projection 14 masks or covers the point of the barb 3 and bridges the space between the bend 2 and the point of the barb 3 it is obvious that the removal of the contents of the hook will be facilitated.

The wire 11 is bent to a form that will cause it to normally retain a position away from the point of the barb and to conform to the shape of the hook as disclosed in Figs. 1 and 3 of the drawings so as to leave the barb 3 fully exposed when fishing.

When the wire 11 is pulled to an operative position as disclosed in Figs. 2 and 4 of the drawings, it should be observed that a portion of the wire really eliminates the barb 3 and thereby facilitates the removal of the contents of the hook. The projection 14 masks the sharp point of the barb 3 as it is practically impossible to bring the point of the barb into such close alinement with the wire 11 as to prevent the point thereof from catching and tearing the contents of the hook during the removal therefrom.

It is obvious from the foregoing that I have provided improved means adapted to facilitate the removal of the contents of a fish hook and also means adapted to effectively mask the barb during such removal.

Having thus described my invention what I claim as new and desire to secure by Letters Patent is—

1. The combination with a fish hook of means operatively connected thereto and adapted to strip the barb of said hook.

2. The combination with a fish hook of a wire slidably connected thereto and adapted to strip the barb of said hook.

3. The combination with a fish hook of a wire slidably connected thereto and throughout the length thereof one end of said wire being slidably connected to the barb of said hook and adapted to strip said barb when said wire is operated.

4. The combination with a fish hook having a slotted barb of a flexible wire slidably connected to the hook and having one end slidably mounted within the slotted barb whereby said barb may be stripped.

5. The combination with a fish hook having a longitudinally slotted barb of a flexible wire slidably connected to the hook and having one end thereof slidably mounted within the slotted barb and adapted to bridge a portion of the space between the barb and the bend of the hook and thereby strip and mask said barb.

6. The combination with a fish hook having a longitudinally slotted barb of a flexible wire slidably connected to the hook and having one end thereof slidably mounted within the slotted barb and adapted to bridge a portion of the space between the bend and the barb of the hook and thereby strip said barb; and a projection formed on the end of the wire near the barb and arranged to mask the same when the space is bridged.

In witness whereof I hereunto set my signature.

ARCHIBALD A. ANDERSON.